No. 857,284. PATENTED JUNE 18, 1907.
S. V. HUBER.
CUTTING TOOL.
APPLICATION FILED MAR. 5, 1907.

2 SHEETS—SHEET 1.

WITNESSES:
J. Herbert Bradley.
Charles Barnett.

INVENTOR
Sigmund V. Huber
by Christy and Christy
Atty's

No. 857,284. PATENTED JUNE 18, 1907.
S. V. HUBER.
CUTTING TOOL.
APPLICATION FILED MAR. 5, 1907.

2 SHEETS—SHEET 2.

WITNESSES:
J. Herbert Bradley.
Charles Barnett.

INVENTOR
Sigmund V. Huber
by Christy and Christy
Att'y's.

UNITED STATES PATENT OFFICE.

SIGMUND V. HUBER, OF PITTSBURG, PENNSYLVANIA.

CUTTING-TOOL.

No. 857,284.  Specification of Letters Patent.  Patented June 18, 1907.

Application filed March 5, 1907. Serial No. 360,735.

*To all whom it may concern:*

Be it known that I, SIGMUND V. HUBER, residing at Pittsburg, in the county of Allegheny and State of Pennsylvania, a citizen of the United States, have invented or discovered certain new and useful Improvements in Cutting-Tools, of which improvements the following is a specification.

The invention described herein relates to certain improvements in cutting off tools for rods, tubes, etc., and consists generally stated in the combination of a series of two or more cutters and means for simultaneously shifting said cutters radially different distances, whereby successive cutters will project into the article a greater distance than the preceding. Each cutter operates on material at the bottom of the groove or furrow formed by the preceding cutter.

The invention is hereinafter more fully described and claimed.

Figure 1:
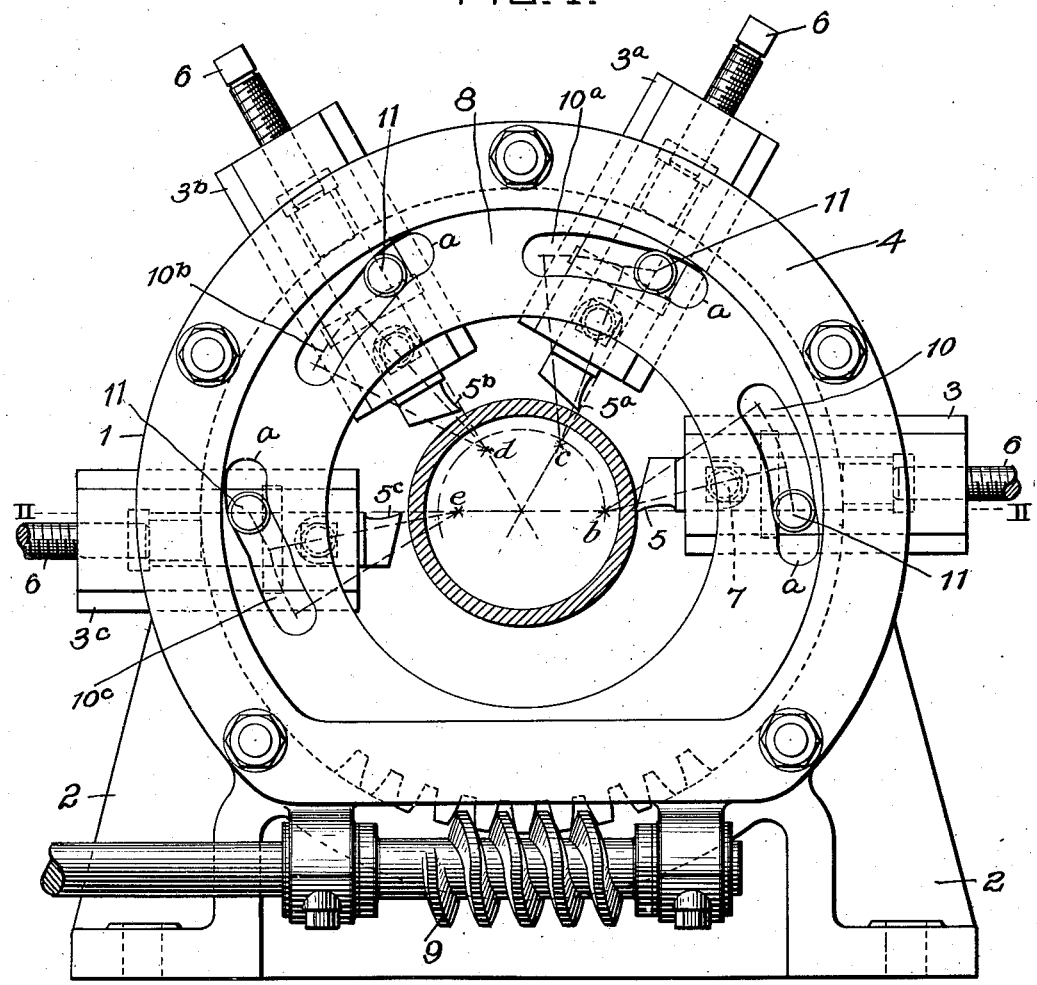
Figure 2:
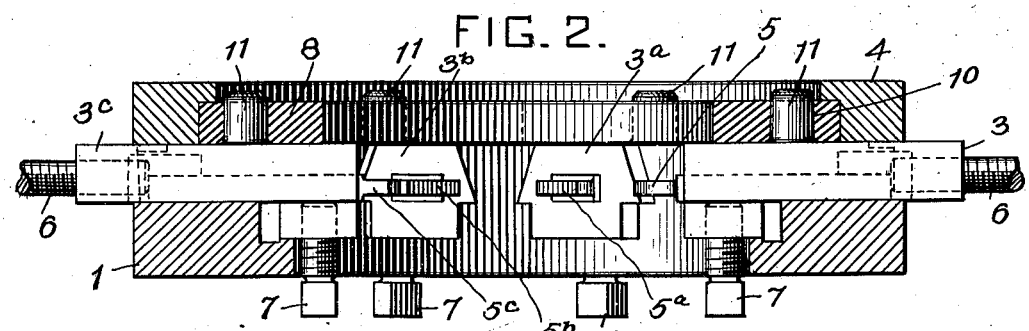
Figure 3:
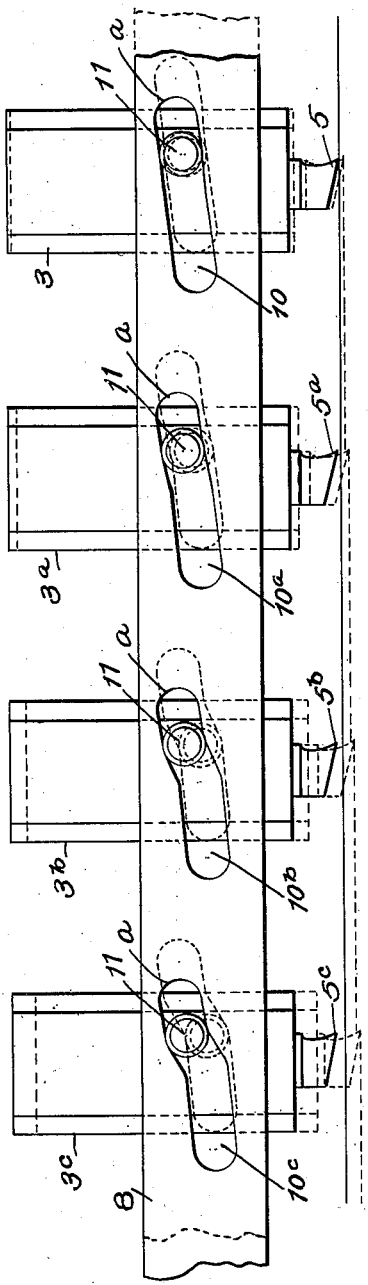
Figure 4:
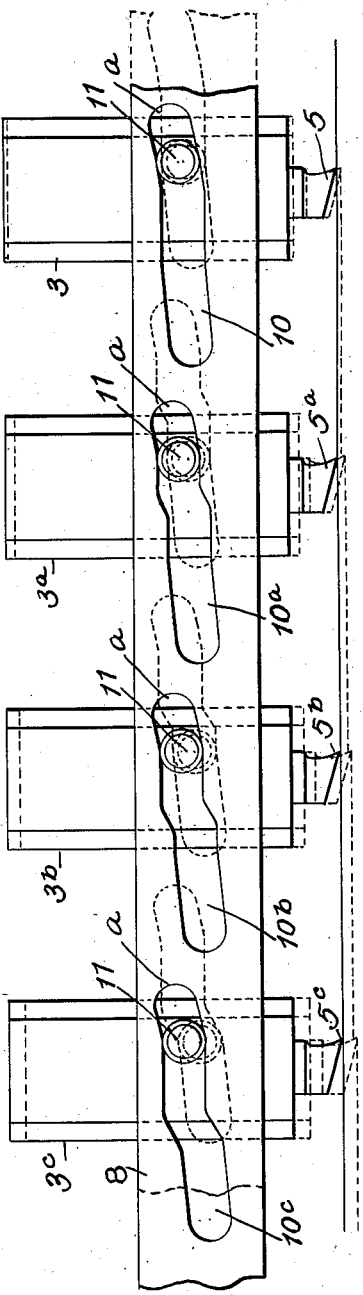

In the accompanying drawing forming a part of this specification Figure 1 is a side elevation of my improved cutting mechanism; Fig. 2 is a sectional view on a plane indicated by the line II—II Fig. 1; Fig. 3 is a diagrammatic view illustrating the movement and operation of the cutters; and Fig. 4 is a similar view illustrating a modification in the manner of shifting the cutters.

In the practice of my invention, the annular head 1 is provided with feet 2 whereby it may be secured to the frame of a machine such as is well known in the art having revolving heads provided with means for gripping the rod or pipe to be cut.

The head is provided with radial grooves for the reception of the cutter carrying blocks 3, 3ª etc., which are held with freedom of longitudinal movement in said grooves by a cap plate 4. The cutters 5, 5ª, etc., are arranged in grooves in the blocks 3, and provision is made for adjusting the cutters in the blocks, as for example by screws 6, which will shift the cutters longitudinally and set screws 7, whereby the cutters are held in their adjusted positions. It is preferred that cutters be so adjusted in their holders or blocks 3, 3ª etc., that cutters successive in the direction of rotation of the pipe or rod, should be nearer the center of the article than the preceding cutter. This relative adjustment of the cutters is not however essential but desirable.

Suitable means are employed for shifting the cutters inwardly in succession, the succeeding cutters being shifted in a distance greater than that of the preceding cutter, proportional to the cut made by such preceding cutter and to be made by such succeeding cutter. A convenient means for shifting these cutters is shown in the drawings and consists of a plate 8 held in position by the cap plate 4 and provided with teeth for engagement with the worm 9. This plate is provided with a series of slots 10, 10ª, etc., for the reception of pins 11 on the sliding blocks 3. The slot 10 is so constructed and arranged that when the plate 8 is shifted in one direction the block 3 with its cutter will be moved inwardly so that the cutter will bite into the rod or pipe. The slot 10ª is so constructed and arranged that the block 3ª will be shifted inwardly on the movement of the plate 8 but at a higher speed and subsequently to the movement of the cutter 5 so that the cutter 5ª will operate in the groove or furrow cut by the cutter 5. The slots in the plate 8 for shifting the other cutters, are similarly proportioned that each cutter will begin to act subsequent to the preceding cutter and in the groove or furrow formed by such preceding cutter.

It will be observed that the cutters are so set in the blocks 3, 3ª, etc., and the latter are so shifted that the cutters are moved in progressively greater distances, and in such manner that they will begin to operate successively in the groove or furrow formed by the preceding cutter.

As the ends of tubes or pipes are sometimes flared or of greater diameter than other portions thereof, provision is made for shifting the blocks and cutters outwardly from their normal positions by angular extensions $a$ of the slots.

In the construction shown in Fig. 1 and indicated diagrammatically in Fig. 3, the cutters are so adjusted that before being shifted their edge will have different positions relative to the perimeter of the rod or tube, *i. e.* the edge of cutter 5 will be nearly in contact with the tube, the cutter 5ª a short distance, say one thirty-second ($\frac{1}{32}$) of an inch farther out, the cutter 5ᵇ two thirty-seconds ($\frac{2}{32}$) and the cutter 5ᶜ three thirty-seconds ($\frac{3}{32}$) of an inch from the tube. The cutter shifting mechanism is so constructed that the cutter 5 is shifted first the distance necessary to make the desired cut. While the first cutter is being shifted and performing a portion of its work, the second cutter is being shifted, but this cutter originally stands farther from the tube, and must be shifted not only this distance but also a distance equal to the cut made by cutter 5 plus the depth of cut to be required of the tool $5^a$. The cutters $5^b$ and $5^c$ are shifted during the same time, the distance between their edges and the tube and a further distance equal to the depth of preceding cuts plus the depth of cuts to be made by said cutters. After all of the cutters have been shifted as described to cutting position, each succeeding cutter at a depth greater than the preceding cutter, the cutter shifting mechanism will shift all the cutters simultaneously and an equal distance.

It is characteristic of my improvement that the working portions of the slots 10, $10^a$, etc., are formed on arcs of circles, the centers of which are at successively shorter distances from the axis of the head, as will be seen by reference to Fig. 1, where the centers for the arcs on which the slots are formed are indicated at $b, c, d$ and $e$.

If desired all the cutters may be adjusted to stand an equal distance from the tube or rod in which case the cutters must be shifted to operative position in succession, i. e. each cutter should attain operative position before the next cutter is shifted.

Fig. 4 shows diagrammatically form of slots whereby the successive movements of the cutters may be effected. It will be observed that the slots $10^a$, $10^b$, etc., have portions formed on arcs of circles the centers of which coincide with the axis of the head, and that the concentric portions increase in length in successive slots. While the pins 11 are in these concentric portions, the cutters will not be shifted. The construction shown in Fig. 4 is practicable but is undesirable on account of the length of the slots.

I claim herein as my invention:

1. A cutting tool having in combination a series of cutters and means for shifting said cutters through successively greater distances.

2. A cutting tool having in combination a series of cutters and means for shifting the cutters preliminarily through successively greater distances and for shifting them equally thereafter.

3. A cutting tool having in combination a series of radially movable cutters and means for causing the cutters to bite in the same plane and in succession on the article operated on.

4. A cutting tool having in combination a head, a series of cutters radially arranged in the head, and a plate rotatively mounted on the head and provided with means for shifting the cutters inwardly, each successive cutter to a greater depth than the preceding cutter.

5. A cutting tool having in combination a head, a plate rotatably mounted on the head and provided with slots formed on arcs of circles having their centers at successively shorter distances from the axis of the tool, cutter carrying blocks provided with pins projecting into said slots, and means for rotating the plate.

In testimony whereof, I have hereunto set my hand.

SIGMUND V. HUBER.

Witnesses:
J. HERBERT BRADLEY,
CHARLES BARNETT.